(12) United States Patent
Ashby et al.

(10) Patent No.: US 10,853,601 B2
(45) Date of Patent: Dec. 1, 2020

(54) BARCODE READING DEVICE THAT CONTROLS ILLUMINATION WITHOUT SIGNALING FROM AN IMAGE SENSOR

(71) Applicant: The Code Corporation, Draper, UT (US)

(72) Inventors: Mark Ashby, Taylorsville, UT (US); Ryan Hoobler, Salt Lake City, UT (US)

(73) Assignee: The Code Corporation, Murray, UT (US)

( * ) Notice: Subject to any disclaimer, the term of this patent is extended or adjusted under 35 U.S.C. 154(b) by 0 days.

(21) Appl. No.: 16/186,398

(22) Filed: Nov. 9, 2018

(65) Prior Publication Data

US 2020/0151412 A1    May 14, 2020

(51) Int. Cl.
*G06K 7/10*  (2006.01)
*G06K 7/14*  (2006.01)

(52) U.S. Cl.
CPC ..... *G06K 7/10752* (2013.01); *G06K 7/10881* (2013.01); *G06K 7/1413* (2013.01); *G06K 2007/10524* (2013.01)

(58) Field of Classification Search
CPC .. G06K 7/10722; G06K 7/10772; G06K 7/14; G06K 7/1478

USPC ............ 235/462.41, 462.01, 462.11, 462.24
See application file for complete search history.

(56) References Cited

U.S. PATENT DOCUMENTS

| 2004/0020990 | A1* | 2/2004 | Havens | G06K 7/10574 235/472.01 |
|---|---|---|---|---|
| 2010/0147952 | A1* | 6/2010 | Carlson | G06K 7/10722 235/462.41 |
| 2011/0096181 | A1* | 4/2011 | Carlson | H04N 5/2354 348/222.1 |
| 2013/0068839 | A1* | 3/2013 | Drzymala | G06K 7/0004 235/454 |
| 2019/0094407 | A1* | 3/2019 | Zhang | G01V 5/0058 |

* cited by examiner

*Primary Examiner* — Edwyn Labaze
(74) *Attorney, Agent, or Firm* — Timothy P. O'Hagen; Ray Quinney & Nebeker

(57) ABSTRACT

A barcode reading device includes an image sensor comprising a photosensor array and control circuitry configured to control an exposure period for the photosensor array. The barcode reading device also includes one or more illumination sources configured to generate illumination for illuminating a target area. The barcode reading device also includes circuitry that is configured to read out image data from the photosensor array in response to a trigger signal. The circuitry is also configured to, independent of controlling the exposure period for the photosensor array, illuminate a target area by activating the one or more illumination sources in response to the trigger signal.

16 Claims, 5 Drawing Sheets

BARCODE READING DEVICE THAT CONTROLS ILLUMINATION WITHOUT SIGNALING FROM AN IMAGE SENSOR

BACKGROUND

A barcode is an optical machine-readable representation of information. Devices for identifying or extracting information from barcodes are often referred to as barcode readers or barcode reading devices. Image-based barcode readers operate by capturing and decoding images of barcodes. In typical operation, one or more light sources are activated to illuminate a target area that includes a barcode. Light is reflected from the barcode toward the barcode reader. One or more lenses within the barcode reader focus an image of the barcode onto an image sensor, which is a two-dimensional array of photosensors (i.e., detectors that are sensitive to electromagnetic radiation). The photosensors are read electronically to provide a two-dimensional array of image data corresponding to the barcode. A decoder then processes the image data and extracts the information contained in the barcode.

An image sensor may be configured to capture images using a global shutter mode of operation, in which all of the photosensors within the image sensor are exposed at the same time for the duration of an exposure period. During the exposure period, charge accumulates on each photosensor based on the incident illumination. At the end of the exposure period, the charge is read out row by row. An image sensor that captures images using a global shutter mode of operation may be referred to herein as a global shutter image sensor.

Global shutter image sensors typically provide a flash signal that indicates the start and end of an exposure period. In a conventional barcode reader, the flash signal is provided to the circuitry that controls illumination. More specifically, the flash signal notifies the illumination control circuitry when the exposure period starts (so that the illumination control circuitry can turn the illumination on) and when the exposure period ends (so that the illumination control circuitry can turn the illumination off and not affect the next frame of image data).

There are several problems with barcode readers that use the flash signal from a global shutter image sensor to control illumination. For example, having the illumination control circuitry be dependent on a signal from the image sensor places constraints on the architecture of the barcode reader, thereby increasing its complexity. Furthermore, having the illumination control circuitry be dependent on a signal from the image sensor may increase the power consumption of the barcode reader, thereby decreasing its battery life. Also, if the image sensor malfunctions and does not provide the flash signal at the proper time, this negatively affects the timing of the illumination as well. Accordingly, what is needed is a control system for a barcode reader with a global shutter image sensor that does not use any signals from the global shutter image sensor to control illumination.

SUMMARY

In accordance with an aspect of the present disclosure, a barcode reading device is disclosed. The barcode reading device includes an image sensor that includes a photosensor array and control circuitry configured to control an exposure period for the photosensor array. The barcode reading device also includes one or more illumination sources configured to generate illumination for illuminating a target area. The barcode reading device also includes circuitry that is configured to read out image data from the photosensor array in response to a trigger signal. The circuitry is also configured to, independent of controlling the exposure period for the photosensor array, illuminate a target area by activating the one or more illumination sources in response to the trigger signal.

The trigger signal may include a plurality of trigger pulse signals. The barcode reading device may further include memory. The circuitry may also be configured to, in response to each trigger pulse signal, read out a frame of image data from the photosensor array and store the frame of image data to the memory of the barcode reading device.

The plurality of trigger pulse signals may include a first plurality of trigger pulse signals interspersed with a second plurality of trigger pulse signals. The circuitry may also be additionally configured to generate an illumination signal that causes the one or more illumination sources to be activated following the first plurality of trigger pulse signals and to be deactivated following the second plurality of trigger pulse signals.

The illumination signal may alternate between an on value corresponding to activating the one or more illumination sources and an off value corresponding to deactivating the one or more illumination sources. In some embodiments, the on value may correspond to odd trigger pulse signals from the plurality of trigger pulse signals. Alternatively, in other embodiments, the on value may correspond to even trigger pulse signals from the plurality of trigger pulse signals.

The barcode reading device may further include a decoder that is configured to generate the trigger signal in response to detecting a trigger condition. A duration of the exposure period may be set by the decoder.

In accordance with another aspect of the present disclosure, a barcode reading device is disclosed. The barcode reading device includes an image sensor that includes a photosensor array and control circuitry configured to control an exposure period for the photosensor array. The barcode reading device also includes one or more illumination sources configured to generate illumination for illuminating a target area. The barcode reading device also includes a decoder that is configured to generate a trigger signal in response to detecting a trigger condition. The barcode reading device also includes readout circuitry that is configured to read out image data from the photosensor array in response to the trigger signal. The barcode reading device also includes illumination circuitry configured to activate, independent of any signaling from the image sensor, the one or more illumination sources for illuminating the target area in response to the trigger signal.

The trigger signal may include a plurality of trigger pulse signals generated at a pulse frequency. The barcode reading device may further include memory. The readout circuitry may also be configured to, in response to each trigger pulse signal, read out a frame of image data from the photosensor array and store the frame of image data to the memory of the barcode reading device.

The plurality of trigger pulse signals may include a first plurality of trigger pulse signals interspersed with a second plurality of trigger pulse signals. The illumination circuitry may additionally be configured to generate an illumination signal that causes the one or more illumination sources to be activated following the first plurality of trigger pulse signals and to be deactivated following the second plurality of trigger pulse signals.

The illumination signal may alternate between an on value corresponding to activating the one or more illumination sources and an off value corresponding to deactivating the one or more illumination sources. In some embodiments, the on value may correspond to odd trigger pulse signals from the plurality of trigger pulse signals. Alternatively, in other embodiments, the on value may correspond to even trigger pulse signals from the plurality of trigger pulse signals.

In accordance with another aspect of the present disclosure, a barcode reading device is disclosed. The barcode reading device includes an image sensor that includes a photosensor array and control circuitry configured to control an exposure period for the photosensor array. The barcode reading device also includes one or more illumination sources configured to generate illumination for illuminating a target area. The barcode reading device also includes a decoder that is configured to generate a trigger signal in response to detecting a trigger condition. The trigger signal may include a plurality of trigger pulse signals. The barcode reading device also includes memory that includes an image buffer. The barcode reading device also includes readout circuitry that is configured to, in response to each trigger pulse signal, read out a frame of image data from the photosensor array and store the frame of image data to the image buffer. The barcode reading device also includes illumination circuitry configured to activate, independent of any signaling from the image sensor, the one or more illumination sources for illuminating the target area in accordance with an illumination signal.

The plurality of trigger pulse signals may cause the illumination signal to alternate between an on value corresponding to activating the one or more illumination sources and an off value corresponding to deactivating the one or more illumination sources. In some embodiments, the on value may correspond to even trigger pulse signals from the plurality of trigger pulse signals. Alternatively, in other embodiments, the on value may correspond to odd trigger pulse signals from the plurality of trigger pulse signals.

DETAILED DESCRIPTION

Figure 1:
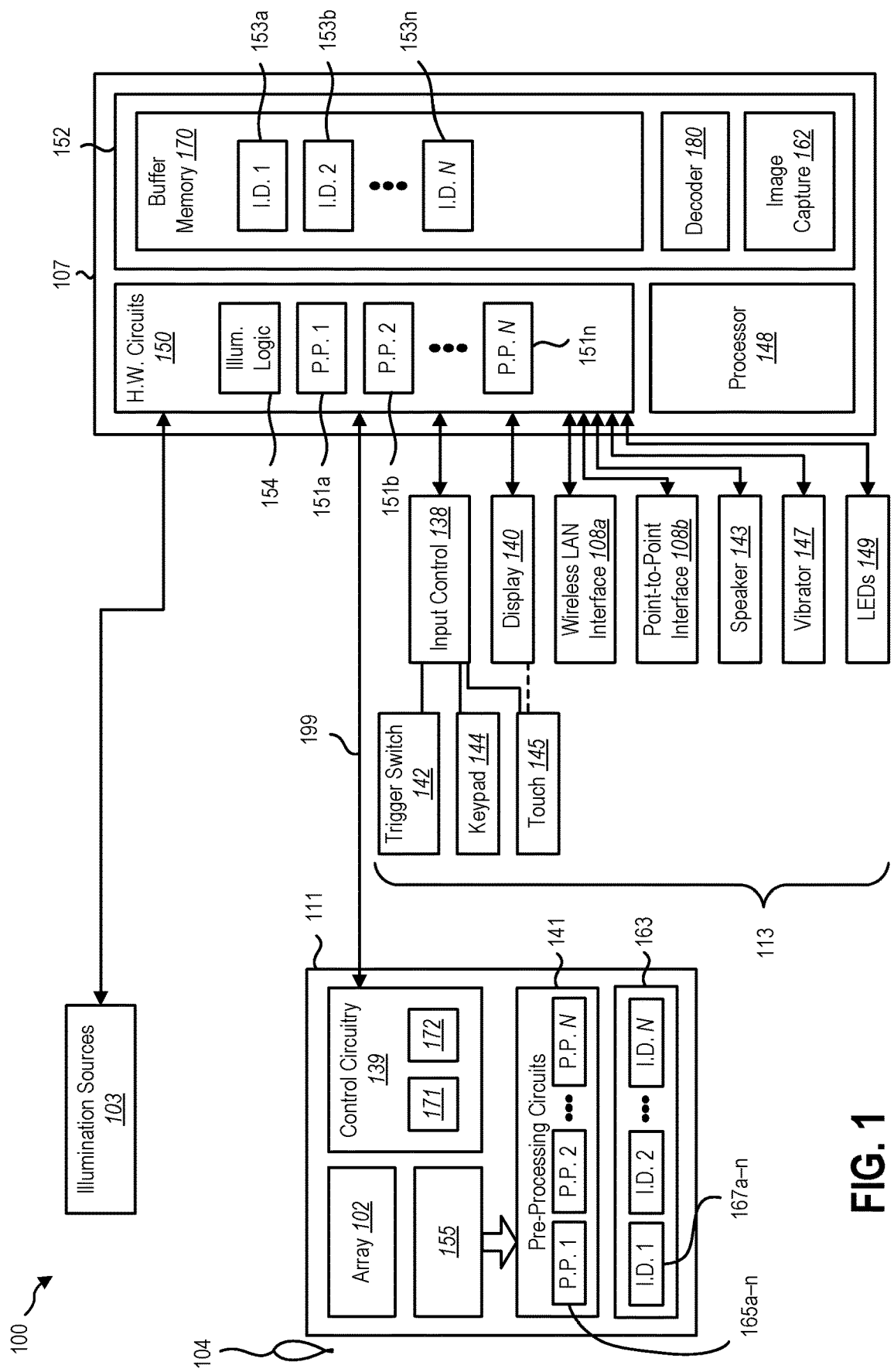
FIG. 1 illustrates an example of a barcode reader in accordance with the present disclosure.

FIG. 1 illustrates an example of a barcode reader 100 in accordance with the present disclosure. As shown in FIG. 1, the barcode reader 100 may include an image capture control and decode system 107, an image sensor system package 111, an illumination system including illumination logic 154 and one or more illumination sources 103, and various input/output (I/O) peripheral systems 113.

The image sensor system package 111 and the image capture control and decode system 107 may be included in two separate packages, each of which may include one or more silicon dies that may include: i) a processor; ii) hardware circuits including digital signal processing and/or gate logic; and iii) memory. The processor may be a general-purpose single or multi-die microprocessor (e.g., an ARM), a special purpose microprocessor (e.g., a digital signal processor (DSP)), a microcontroller, a programmable gate array, etc. The processor may be referred to as a central processing unit (CPU). The memory may be any combination of non-volatile memory or storage and volatile memory or storage. The non-volatile memory may include a combination of read-only memory (ROM) and/or flash memory.

The illumination system may include one or more illumination sources 103 and illumination logic 154. The illumination sources 103 may be, for example, light-emitting diodes (LEDs). The illumination logic 154 may be configured to activate one or more of the illumination sources 103 to emit illumination into a target area.

The I/O peripheral systems 113 may include a user interface comprising input control 138 and/or a display 140. The input control 138 may include a trigger switch 142, a keypad 144, and/or a touch panel 145, such as a touch screen over the display 140. In addition, the barcode reader 100 may have one or more output devices that convey information to a user. Such output devices may include the touch panel 145, which may be a touch screen, a speaker 143, a vibrator 147, and/or one or more components that illuminate in a manner visible to a user, such as one or more light-emitting diodes (LEDs) 149.

The I/O peripheral systems 113 may further include one or more communication interfaces 108. The communication interfaces 108 may include a wireless local-area network (LAN) interface 108a and a point-to-point interface 108b which may be a wireless point-to-point interface and/or a hardwired point-to-point interface.

The wireless LAN interface 108a may permit the barcode reader 100 to be an addressable endpoint in a wireless local area network and communicate with a host device through the LAN using, for example, Transmission Control Protocol/Internet Protocol (TCP/IP) or the like.

The wireless point-to-point interface(s) 108b may be, for example, a Bluetooth® interface to enable the barcode reader 100 to establish a wireless point-to-point communication link with, and communicate over the wireless communication link with, a host device (i.e., a host computer).

The hardwired point-to-point interface(s) 108b may comprise a Universal Asynchronous Receiver/Transmitter (UART) or a Universal Serial Bus (USB). In one or more embodiments, the barcode reader may utilize the point-to-point interface(s) 108b to establish a point-to-point connection with a host device using a multi-conductor data interface.

The image capture control and decode system 107 may include: i) a processor 148; ii) a memory 152; and iii) hardware circuits 150 for coupling to, and driving operation of, each of the illumination sources 103, the I/O peripheral systems 113, and the image sensor system package 111.

The processor 148, as described, may be a general-purpose single or multi-die microprocessor (e.g., an ARM), a special purpose microprocessor (e.g., a digital signal processor (DSP)), a microcontroller, a programmable gate array, etc. The processor 148 may be referred to as a central processing unit (CPU). Although just a single processor 148 is shown in FIG. 1, in an alternative configuration, a combination of processors (e.g., an ARM and DSP) may be used.

The hardware circuits 150 may provide an interface between the image capture control and decode system 107 and each of the illumination sources 103, the I/O peripheral systems 113, and the image sensor system package 111. The hardware circuits 150 may further include illumination logic 154 and pre-processing circuits 151a-n, each of which will be described in more detail herein.

The memory 152, as described, may be any combination of non-volatile memory or storage and volatile memory or storage. The memory 152 may include a buffer memory 170 (e.g., an image buffer), a decoder 180, and an image capture module 162. These components may be stored in any combination of volatile and non-volatile memory. Some modules may be stored in both volatile and non-volatile memory, for example, with permanent storage of the module in non-volatile memory and a temporary copy stored in volatile memory for execution by the processor 148. In addition to, or as an alternative to, these modules, the memory 152 may store any number of other modules including but not limited to those set forth in the patent applications incorporated by reference in this disclosure. Additional detail with regard to one or more components of the image capture control and decode system 107 is included below.

As mentioned in some detail above, and as shown in FIG. 1, the barcode reader 100 additionally includes the image sensor system package 111, which may include: i) a two-dimensional photosensor array 102 onto which illumination from the field of view of the barcode reader 100 is focused by an optic system 104 (e.g., one or more lenses for focusing an image of a barcode); ii) hardware gate logic 141 implementing one or more pre-processing circuits 165a-n; iii) volatile memory or storage such as random access memory implementing an image buffer 163; iv) hardware gate logic implementing bus logic 155 for transferring each image frame captured by the photosensor array 102 to the hardware gate logic 141 (or the image buffer 163); and v) control circuitry 139. The control circuitry 139 may include a combination of gate logic, volatile memory or storage, and a processor executing code stored in the memory implementing control of the photosensor array 102 (image read-out), the bus logic 155, the hardware gate logic 141, and the image buffer 163. The control circuitry 139 can transfer image data records to the image capture control and decode system 107. The control circuitry 139 may include exposure circuitry 171 that defines an exposure period for the photosensor array 102. The control circuitry 139 may also include readout circuitry 172 that is configured to read out image data from the photosensor array 102.

The photosensor array 102 may comprise a two-dimensional array of pixels with each pixel comprising an active photosensitive region capable of measuring or quantifying the intensity of illumination incident on the pixel fabricated, for example, using known complementary metal oxide semiconductor (CMOS) sensor technology. The photosensor array 102 may be used to capture images in accordance with a global shutter mode of operation. Each pixel may be a photodiode that accumulates charge over the duration of an exposure period. Prior to commencement of the exposure period the photodiode may be coupled to ground to dissipate an accumulated charge and the exposure period for the pixel may commence when the photodiode is de-coupled from ground so that a charge accumulates in proportion to the intensity of illumination incident on the photodiode. The charge on the photodiode continues to accumulate so long as illumination is incident on the photodiode. The exposure period ends when the accumulated charge is measured by an analog to digital (A/D) converter.

In one embodiment, the photodiode may couple to the input of an A/D converter when the control circuitry 139 (e.g., exposure control circuitry) generates a read signal and, when the photodiode is coupled to the A/D converter, the A/D converter generates a digital value representative of the accumulated charge at the time the photodiode is coupled to the A/D converter. This digital value is input to a register of the bus logic 155 for transfer to the pre-processing circuits 165a-n (or the image buffer 163).

In another embodiment, the photodiode may be coupled to the input of an A/D converter prior to the end of the exposure period. In this embodiment, the A/D converter may be continually making a digital value representative of the accumulating charge available at its output port with that digital value continually increasing as charge accumulates on the photodiode. In other words, the digital value may be continually updated to represent the increasing voltage as charge accumulates on the photodiode. In this embodiment, when the control circuitry 139 generates a read signal, the then current digital value (at the time of the read signal) is read or input to a register of the bus logic 155 for transfer to the pre-processing circuits 165a-n (or the image buffer 163).

Additional detail will now be provided with regard to one or more specific components as well as interactions between components of the systems of the barcode reader 100 indicated above. As mentioned above, the hardware circuits 150 include illumination logic 154 for controlling illumination provided by the illumination sources 103. The illumination logic 154 may control the illumination sources 103 to illuminate a field of view of the barcode reader 100. Advantageously, control of the illumination sources 103 may occur without the use of any signals from the image sensor system package 111. For example, the illumination logic 154 may control the illumination sources 103 without receiving or otherwise depending on any signals from the photosensor array 102 or any other components of the image sensor system package 111.

In one or more embodiments, the decoder 180 and/or the image capture module 162 may provide illumination parameters to the illumination logic 154. The illumination parameters control the illumination settings to be used for capture of an image frame. More specifically, the illumination parameters may define such illumination settings as: i) identifying one or more illuminators to activate over a duration of time; and ii) the intensity of illumination to be generated by one or more of the illuminators to be activated. In certain exemplary embodiments the intensity may be defined as: i) a percentage from zero percent (0%) to one hundred percent (100%) representing the percent of a maximum illumination intensity that can be generated by the illumination sources 103; ii) pulse-width-modulation (PWM) parameters representing a percentage of a pulse cycle for which maximum operating power is applied to the illumination sources 103 in a pulsing pattern; and iii) a percentage greater than one hundred percent (100%) representing a power level to be applied if the illumination sources 103 are to be over-driven.

In certain embodiments, the illumination parameters may be provided to the illumination logic 154 for one or more image frames within a burst of image frames to be captured by the photosensor array 102 by the image capture module 162 writing the illumination parameters for each frame to a distinct register within the illumination logic 154.

In the barcode reader 100 depicted in FIG. 1, the hardware circuits 150 include a number of pre-processing circuits 151a-n, which may be implemented within the gate logic of the hardware circuits 150. The pre-processing circuits 151a-n may perform operations such as convolution, binning, sub-sampling and other image processing functions on image data provided by the image sensor system package 111 via the bus 199. The pre-processing circuits 151a-n may write one or more image data records 153a-n to the buffer memory 170.

Each pre-processing circuit 151a-n may receive as input either: i) an image data record 167a-n (or a window of, a binning of, or a sub-sampling of, an image data record 167a-n) directly from the image sensor system package 111 by way of the bus 199; or ii) an image data record 153a-n from the buffer memory 170 which is the result of a different pre-processing circuit 151a-n previously operating on an image data record 167a-n (or a window of, a binning of, or a sub-sampling of, an image data record 167a-n) received from the image sensor system package 111 by way of the bus 199.

It should be noted that one image data record 167a-n (or a window of, a binning of, or a sub-sampling of, an image data record 167a-n) may be input to multiple pre-processing circuits 151a-n, resulting in multiple image data records 153a-n being written to the buffer memory 170 for the same image data record 167a-n (or a window of, a binning of, or a sub-sampling of, an image data record 167a-n).

Further, for a burst of multiple image frames the image data record 167a-n (or a window of, a binning of, or a sub-sampling of, an image data record 167a-n) received and processed by the pre-processing circuits 151a-n may represent different image frames within the burst captured by the photosensor array 102. The image data records 167a-n (or a window of, a binning of, or a sub-sampling of, an image data record 167a-n) received and processed by the pre-processing circuits 151a-n may be the result of applying the same pre-processing functions by pre-processing circuits 165a-n to each of multiple image frames within the burst.

Each image data record 167a-n (or a window of, a binning of, or a sub-sampling of, an image data record 167a-n) received may be input to the same one or more pre-processing circuits 151a-n or may be input to different subsets of pre-processing circuits 151a-n, each subset including one or more pre-processing circuits 151a-n.

It should also be noted that one of the pre-processing circuits 151a-n may simply write the image data record 167a-n (which may be an image frame captured by the photosensor array 102 (full, binned, sub-sampled, and/or cropped) without previous processing by pre-processing circuits 165a-n) to the buffer memory 170 without performing substantive image processing.

Operations performed by, and derivatives of the frame of image data produced by, the pre-processing circuits 151a-n may include: i) transfer of the image data record 167a-n (or a window, binning, or sub-sampling of the image data record 167a-n) to the buffer memory 170 as an image data record 153a-n without substantive processing; ii) binning of an image data record 167a-n (or a window or sub-sampling of the image data record 167a-n) and writing the result to the buffer memory 170 as an image data record 153a-n; iii) sub-sampling of an image data record 167a-n (or a window, binning, or sub-sampling of the image data record 167a-n) and writing the result to the buffer memory 170 as an image data record 153a-n; iv) generating a rotation of an image data record 167a-n (or a window of, a binning of, or sub-sampling of the image data record 167a-n) and writing the result to the buffer memory 170 as an image data record 153a-n; v) generating a convolution of an image data record 167a-n (or a window or sub-sampling of the image data record 167a-n) and writing the result to the buffer memory 170 as an image data record 153a-n; and vi) generating a double convolution, which is a second sequential convolution performed on the result of a previously performed convolution, of an image data record 167a-n (or a window or sub-sampling of the image data record 167a-n) and writing the result to the buffer memory 170 as an image data record 153a-n. Each sequential convolution may utilize a different distinct kernel.

The pre-processing circuits 151a-n may be implemented in hardware gate logic 150 to provide for image processing very quickly such that processing by a pre-processing circuit 151a-n (including generating one or more image data records 153a-n and storing them in the buffer memory 170) may be performed during the limited amount of time that the image data records 167a-n are being transferred to the image capture control and decode system 107 via the bus 199 without requiring storage of the transferred image data records 167a-n in memory prior to pre-processing by the pre-processing circuits 151a-n.

Moreover, in one or more implementations, the pre-processing circuitry 151a-n may facilitate selective storage of images captured in the buffer memory 170. For example, as will be described in further detail below, the pre-processing circuitry 151a-n may store image data for every other frame while deleting or decimating image data for other captured frames. For instance, the pre-processing circuitry 151a-n may store only the odd frames while decimating or discarding even frames. Alternatively, the pre-processing circuitry 151a-n can store even frames while decimating or discarding odd frames. In one or more embodiments, the pre-processing circuitry 151a-n may be configured to automatically discard or decimate data from a first captured image frame followed by selectively storing even or odd captured frames.

The image capture control and decode system 107 may include a decoder 180. The decoder 180 may be configured to (i) determine which of the one or more image data records 167a-n (or windows within one or more image data records 167a-n) may be transferred from the image buffer 163 to the image capture control and decode system 107; ii) determine a permutation of one or more pre-processing functions (performed by pre-processing circuits 151a-n) to apply to each of the image data records 167a-n (or windows within one or more image data records 167a-n) to generate, and write to the buffer memory 170, image data records 153a-n, each of which may also be a derivative of the one or more image frames (whether full, binned, or sub-sampled) captured by the photosensor array 102; iii) determine a permutation of one or more pre-processing functions to apply to each of the image data records 153a-n (or windows within one or more image data records 153a-n) to generate, and write to the buffer memory 170, additional (or replacement) image data records 153a-n, each of which may also be a derivative of the one or more image frames (full, binned, sub-sampled, and/or cropped) captured by the photosensor array 102; and iv) decode the barcode present within the field of view of the barcode reader 100 and imaged within the one or more image frames (whether full, binned, or sub-sampled) captured by the photosensor array 102 and represented by at least a portion of one of the image data records 153a-n derived from such image frame.

The decoder 180 may also be configured to generate a trigger signal, which may include a sequence of trigger pulse signals (as will be explained in greater detail below). The trigger signal may be provided to the illumination logic 154 to control timing of illumination of a target area by the illumination sources 103. The decoder 180 may additionally provide information indicating an intensity and/or a duration for the illumination.

The trigger signal may also be independently provided to the control circuitry 139 in the image sensor system package 111 (e.g., by way of the bus 199) to control when image data is read out from the photosensor array 102. The decoder 180 may also provide the control circuitry 139 with information that defines the end of the exposure period of images that are captured by the photosensor array 102. The end of an exposure period may be defined in relation to detection of a trigger pulse signal. The decoder 180 may also be configured to provide information indicating a gain for one or more A/D converters on the image sensor system package 111, thereby indicating to the control circuitry 139 what gain to set.

As further shown in FIG. 1, the image capture control and decode system 107 may include an image capture module 162. The image capture module 162 may control image capture by: i) defining (or receiving from the decoder 180) image capture parameter values for a burst of one or more image frames to be sequentially captured by the photosensor array 102 of the image sensor package 111 and the image processing to be performed on each image frame; ii) initiating the capture of the sequence of one or more image frames by the photosensor array 102 and the corresponding performance of the image processing thereon by the pre-processing circuits 165a-n to generate image data records 167a-n, each of which may be a derivative of an image frame within the sequence of one or more image frames; and iii) controlling the illumination sources 103 to illuminate the field of view during capture of each frame of the sequence of one or more image frames. The image capture module 162 may further define, or receive from the decoder 180 an indication of, which of the image data records (or portions of the image data records) are to be provided to the decoder 180 for decoding of a barcode.

In one or more embodiments, the image capture module 162 defines a quantity or sequence of image frames to capture and/or ultimately to provide to the buffer memory 170. For example, as mentioned above, the image capture module 162 can selectively identify frames to store to the buffer memory 170 while discarding or decimating other captured frames.

While many features and functionality of components of the barcode reader 100 are described herein, the barcode reader 100 may include additional features and functionality, such as those described in U.S. patent application Ser. No. 14/717,112, titled "BARCODE READER" and filed on May 20, 2015, which is hereby incorporated by reference in its entirety.

Figure 2:
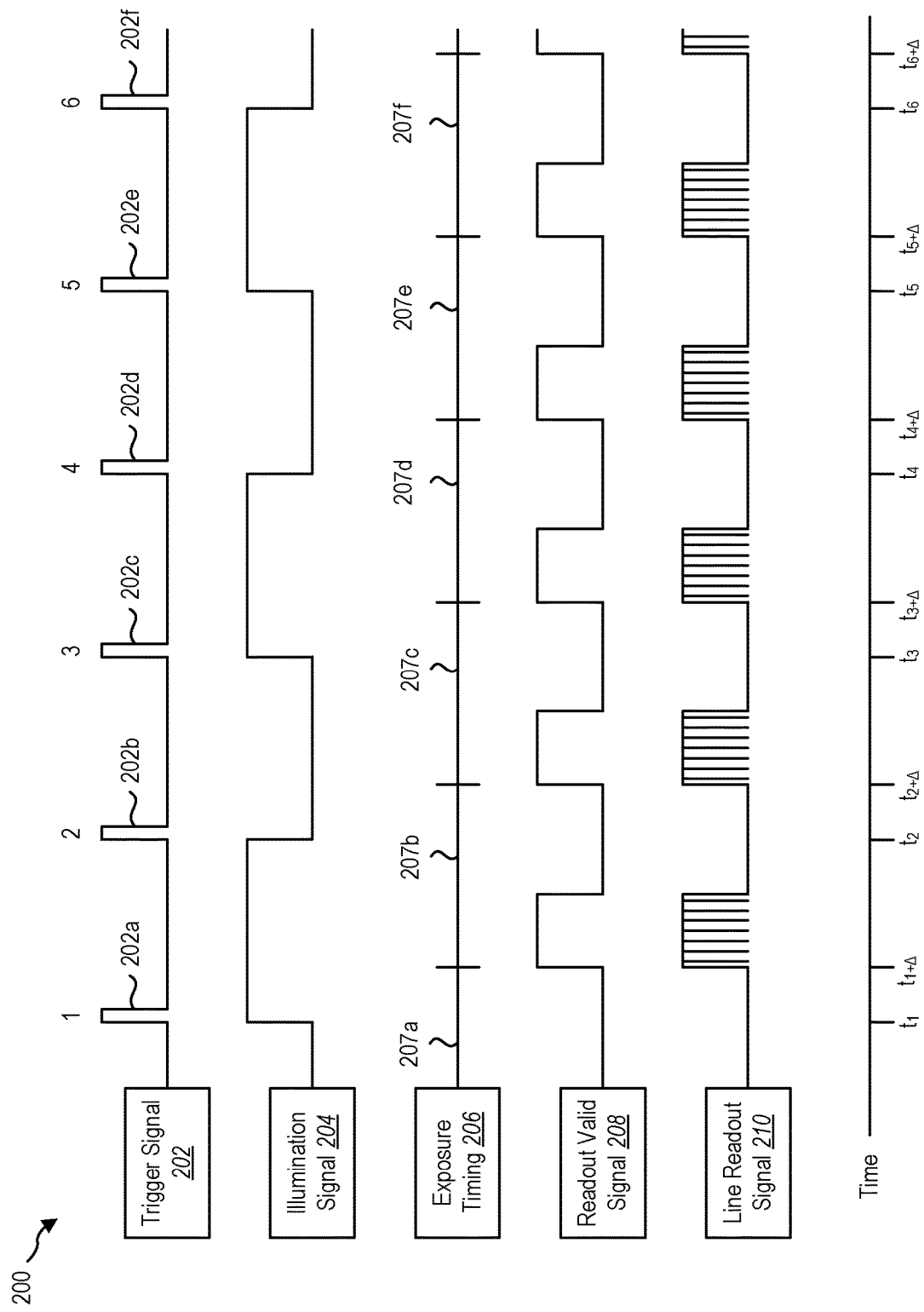
FIG. 2 is a timing diagram that illustrates an example of the timing for a trigger signal, illumination of a target area by one or more illumination sources, and exposure of a photosensor array.

FIG. 2 is a timing diagram 200 that illustrates an example of the timing for illumination of a target area by the illumination sources 103 and exposure of a photosensor array 102 in accordance with one or more embodiments. As shown, one or more of the components of the barcode reader (e.g., the decoder 180) may be configured to generate a trigger signal 202. The trigger signal 202 may be a pulsed signal that pulses at fixed intervals. Thus, the trigger signal 202 may include a sequence of trigger pulse signals 202a-f.

In FIG. 2, a first trigger pulse signal 202a occurs at time $t_1$, a second trigger pulse signal 202b occurs at time $t_2$, and so on. The interval between the trigger pulse signals 202a-f may be greater than the amount of time that is required to read out a frame of image data from the photosensor array 102. The interval between the trigger pulse signals 202a-f may also depend on other factors including but not limited to image processing capabilities and decode times of the decoder 180.

The trigger signal 202 may be generated in response to detecting a trigger condition which indicates that barcode reading is to be commenced. The trigger condition may be detected via user input (e.g., a user selecting a barcode reading option). Other events resulting in a trigger condition may include detecting an object (e.g., if the barcode reader 100 is operating in an object detection mode) or detecting motion (e.g., if the barcode reader 100 is operating in a motion detection mode).

The trigger signal 202 may be provided to the illumination logic 154. In some embodiments, the illumination logic 154 may generate an illumination signal 204 having an "on" value (which causes the illumination sources 103 to be activated) and an "off" value (which causes the illumination sources 103 to be deactivated). The illumination logic 154 may be configured to change the illumination signal 204 to the "on" value after every other trigger pulse signal. Thus, in the example shown in FIG. 2, the illumination logic 154 changes the value of the illumination signal 204 from an "off" value to an "on" value (thereby activating the illumination sources 103) after the first trigger pulse signal 202a, the third trigger pulse signal 202c, the fifth trigger pulse signal 202e, and so forth.

As noted above, the duration of the illumination (e.g., how long the illumination signal 204 remains "on") may be set by the decoder 180 (or another component of the barcode reader 100, such as the image capture module 162). In the depicted example, the illumination signal 204 remains "on" for an entire pulse width (i.e., for an entire period of time between two trigger pulse signals). Alternatively, however, the illumination signal 204 may remain "on" for a period of time that is less than the full pulse width. The illumination signal 204 should remain "on" until after image readout begins. For example, in FIG. 2, the illumination signal 204 changes to an "on" value at time $t_1$. It should remain "on" until at least time $t_1+\Delta$, which is when readout begins (as will be discussed in greater detail below). However, instead of remaining "on" until time $t_2$, the illumination signal 204 may instead change back to the "off" value at time $t_1+\Delta$ (or shortly thereafter, to account for any delay in the relevant circuitry).

Instead of generating an illumination signal 204, the decoder 180 (or another component of the barcode reader 100, such as the image capture module 162) may simply provide instructions to the illumination logic 154 about what illumination intensity to use. For example, at the time of every other trigger pulse signal (e.g., trigger pulse signals 202b, 202d, 202f, etc.), the decoder 180 may instruct the illumination logic 154 to use an intensity value of "0" or OFF. For the remaining trigger pulse signals (e.g., trigger pulse signals 202a, 202c, 202e, etc.) the decoder 180 may determine what the illumination intensity should be (as well as the exposure period and gain) by analyzing a previously captured image.

In addition to being provided to the illumination logic 154, the trigger signal 202 may also be independently provided to the control circuitry 139. The control circuitry 139 (in particular, readout circuitry 172 within the control circuitry 139) may be configured to read out image data from the photosensor array 102 in response to the trigger signal 202.

In a photosensor array 102, each pixel may include a photodiode and a masked charge storage diode. Illumination incident on a photodiode causes charge accumulation on the photodiode. The end of an exposure period occurs when the charge on all photodiodes (or substantially all photodiodes) of the photosensor array 102 is simultaneously (or substantially simultaneously) transferred to the masked charge storage diodes. That charge transfer ends one exposure period and starts the following exposure period.

As noted above, the decoder 180 may provide the control circuitry 139 with information that defines the end of an exposure period, which is when image readout begins (i.e., the process of charge transfer as discussed above). The end of the exposure period may be defined in relation to a trigger pulse signal. In other words, the decoder 180 may instruct the control circuitry 139 to begin reading out image data from the photosensor array 102 some defined period of time after a trigger pulse signal is detected.

To enable the image capture control and decode system 107 (and other hardware and software systems of the barcode reader 100) to accept a frame of image data, the control circuitry 139 may provide a readout valid signal 208 and a line readout signal 210. At the time the control circuitry 139 provides the readout valid signal 208, it also starts providing a digital representation of an image captured by the photosensor array 102 to memory of the barcode reader 100 (e.g., the image buffer 163, for transfer to the buffer memory 170). For example, when the readout valid signal 208 has an on value, circuitry within the image sensor system package 111 may begin use of A/D converters to generate digital values representing the accumulated charge on the photosensors, thereby reading out the image data from the photosensor array 102 to memory of the barcode reader 100. More specifically, the digital values may be output row by row, with the line readout signal 410 being used to separate the last value of a row from the first value of the next row.

In FIG. 2, the exposure timing 206 shows exposure periods 207a-f corresponding to the photosensor array 102. In general, an exposure period ends when a charge transfer (as described above) occurs. Stated another way, an exposure period ends when image data is read out from the photosensor array 102. Also, the end of one exposure period is the beginning of another exposure period.

In the example shown in FIG. 2, the beginning of the first exposure period 207a occurs when image data is read out from the photosensor array 102 at some previous point in time (which is not shown in FIG. 2). The first exposure period 207a ends and the second exposure period 207b begins when readout begins at time $t_1+\Delta$, which is after the first trigger pulse signal 202a at time $t_1$. (The decoder 180 may provide the value of $\Delta$ to the control circuitry 139.) The second exposure period 207b ends and the third exposure period 207c begins when readout begins at time $t_2+\Delta$, which is after the second trigger pulse signal 202b at time $t_2$. The other exposure periods 207c-f have similar timing.

As noted above, in embodiments disclosed herein, the illumination logic 154 controls the illumination sources 103 without using any signals from the control circuitry 139 (or any other components of the image sensor system package 111). Thus, the illumination logic 154 does not know exactly when readout begins. As a result, the illumination sources 103 may remain on after readout begins. For instance, in the example shown in FIG. 2, readout begins at time $t_1+\Delta$, but the illumination sources 103 are not switched off until time $t_2$. After readout occurs, charge begins accumulating for the next image. Having the illumination sources 103 remain on, however, degrades the quality of that image.

To address this issue, the barcode reader 100 may be configured so that it does not use all of the images that are captured by the photosensor array 102. Images that have been degraded (e.g., because the illumination sources 103 remained on after readout started for a previous image, as discussed above) may be decimated (or otherwise discarded).

In the example shown in FIG. 2, the image that is read out from the photosensor array 102 beginning at time $t_1+\Delta$ (and corresponding to the first exposure period 207a) may either be used or decimated. It may be preferable to decimate that image because it is unknown how long the ambient illumination has been accumulating on the photodiodes in the photosensor array 102 before readout begins at time $t_1+\Delta$. The image that is read out from the photosensor array 102 beginning at time $t_2+\Delta$ (and corresponding to the second exposure period 207b) may also be decimated, because the illumination sources 103 remain on after readout begins at time $t_1+\Delta$. However, the image that is read out from the photosensor array 102 beginning at time $t_3+\Delta$ (and corresponding to the third exposure period 207c) may be kept and processed for decoding, because the illumination sources 103 are off from the beginning of the exposure period 207c until the trigger pulse signal 202c occurs. Subsequently captured images may be processed in a similar manner.

In general, in the example shown in FIG. 2, images corresponding to even trigger pulse signals are decimated. Thus, the images that are read out from the photosensor array 102 after the second trigger pulse signal 202b, the fourth trigger pulse signal 202d, and the sixth trigger pulse signal 202f (and so on) are decimated. In some embodiments, the image capture control and decode system 107 (e.g., the pre-processing circuitry 151a-n) may be configured to decimate these images. Alternatively, the image sensor system package 111 (e.g., the pre-processing circuitry 165a-n) may be configured to decimate these images.

Conversely (with one possible exception), images corresponding to odd trigger pulse signals are kept and used for decoding in the example shown in FIG. 2. Thus, the images that are read out from the photosensor array 102 after the third trigger pulse signal 202c and the fifth trigger pulse signal 202e (and so on) are kept and used for decoding. The image that is read out from the photosensor array 102 after the first trigger pulse signal 202a may either be decimated (for the reasons explained previously) or it may be kept and used for decoding.

As shown in FIG. 2, the illumination signal 204 generated by the illumination logic 154 to drive illumination of the illumination sources 103 is independent of the exposure period implemented by the control circuitry 139. In other words, the illumination signal 204 switches from an on value to an off value (and vice versa) independent of the start and stop of the exposure period implemented by the control circuitry 139.

Figure 3:
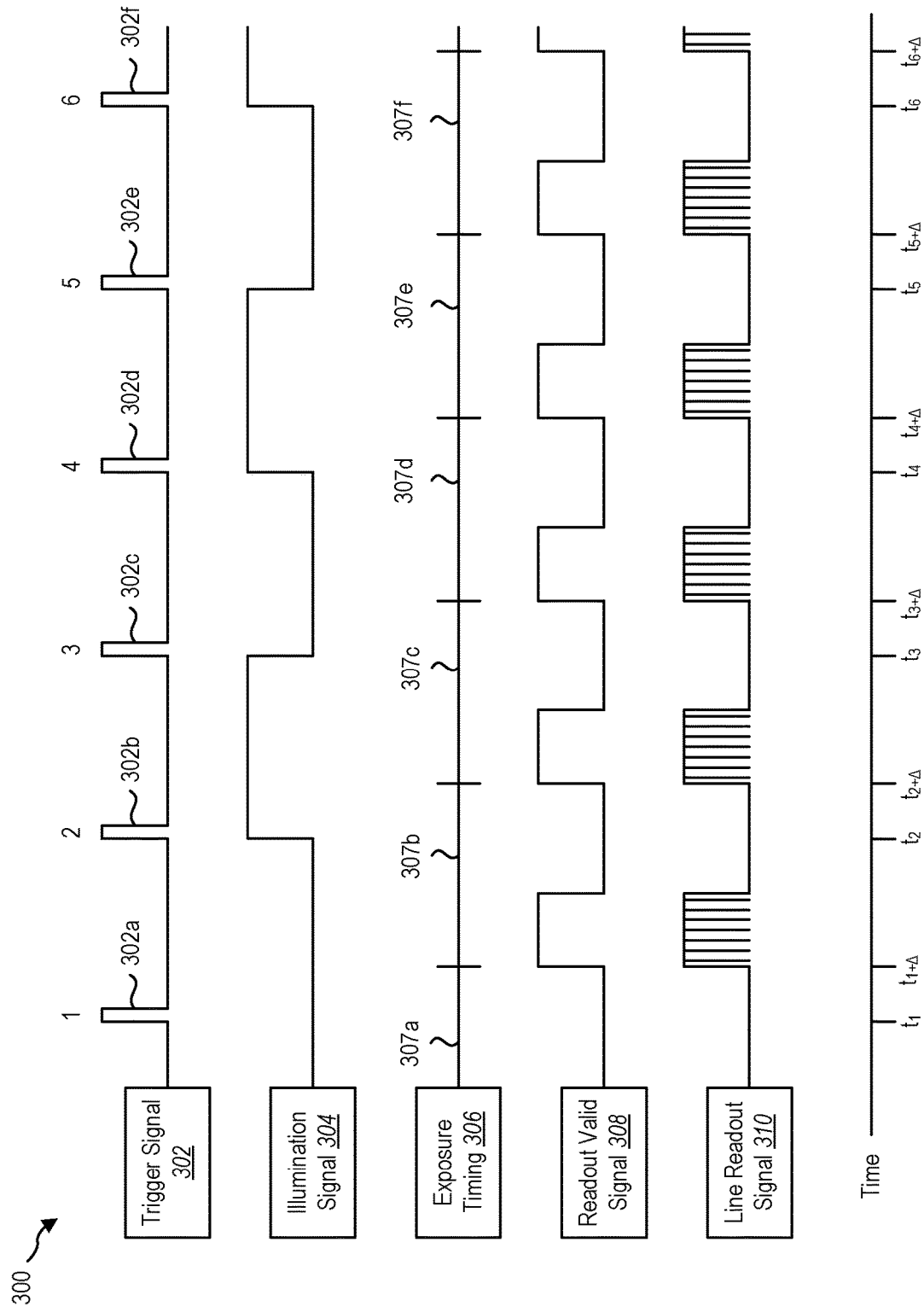
FIG. 3 is a timing diagram that illustrates another example of the timing for a trigger signal, illumination of a target area by one or more illumination sources, and exposure of a photosensor array.

FIG. 3 illustrates another example timing diagram 300, which is similar in many respects to the timing diagram 200 discussed above in connection with FIG. 2. Indeed, similar to the timing diagram 200 of FIG. 2, the timing diagram 300 includes a trigger signal 302, an illumination signal 304, exposure timing 306, a readout valid signal 308, and a line readout signal 310. The trigger signal 302, exposure timing 306, readout valid signal 308, and line readout signal 310 are similar to the corresponding signals discussed above in connection with FIG. 2.

The illumination signal 304, however, has different timing for "on" and "off" values than the illumination signal 204 shown in FIG. 2. In the example shown in FIG. 3, the illumination logic 154 may be configured so that the illumination signal 304 turns "on" after every even trigger pulse signal (i.e., the second trigger pulse signal 302b, the fourth trigger pulse signal 302d, the sixth trigger pulse signal 302f, etc.).

In the example shown in FIG. 3, images corresponding to odd trigger pulse signals are decimated, while images corresponding to even trigger pulse signals are kept and used for decoding. Thus, the images that are read out from the photosensor array 102 after the first trigger pulse signal 302a, the third trigger pulse signal 302c, and the fifth trigger pulse signal 302e (and so on) are decimated. However, the images that are read out from the photosensor array 102 after the second trigger pulse signal 302b, the fourth trigger pulse signal 302d, and the sixth trigger pulse signal 302f (and so on) are kept and used for decoding.

In addition to being implemented in a dedicated barcode reader (such as the barcode reader 100 shown in FIG. 1), the techniques disclosed herein may be implemented in a mobile device that is configured to read barcodes. For example, FIG. 4 illustrates an example of a mobile device 400 that may be configured to implement the techniques disclosed herein.

The mobile device 400 may include a processor 444 and memory 446. The processor 444 may be embodied as a combination of one or more microprocessors, microcontrollers, digital signal processors (DSP), or the like, and, when operating, may execute instructions (in the form of an operating system and/or applications) stored in the memory 446. The memory 446 may be any component capable of storing electronic information, including an operating system and/or application instructions executable by the processor 444, and may be embodied as read-only memory (ROM), random access memory (RAM), magnetic disk storage media, optical storage media, flash memory devices, on-board memory included with the processor 444, erasable programmable read-only memory (EPROM), electrically erasable programmable read-only memory (EEPROM), and/or registers, etc.

Figure 4:
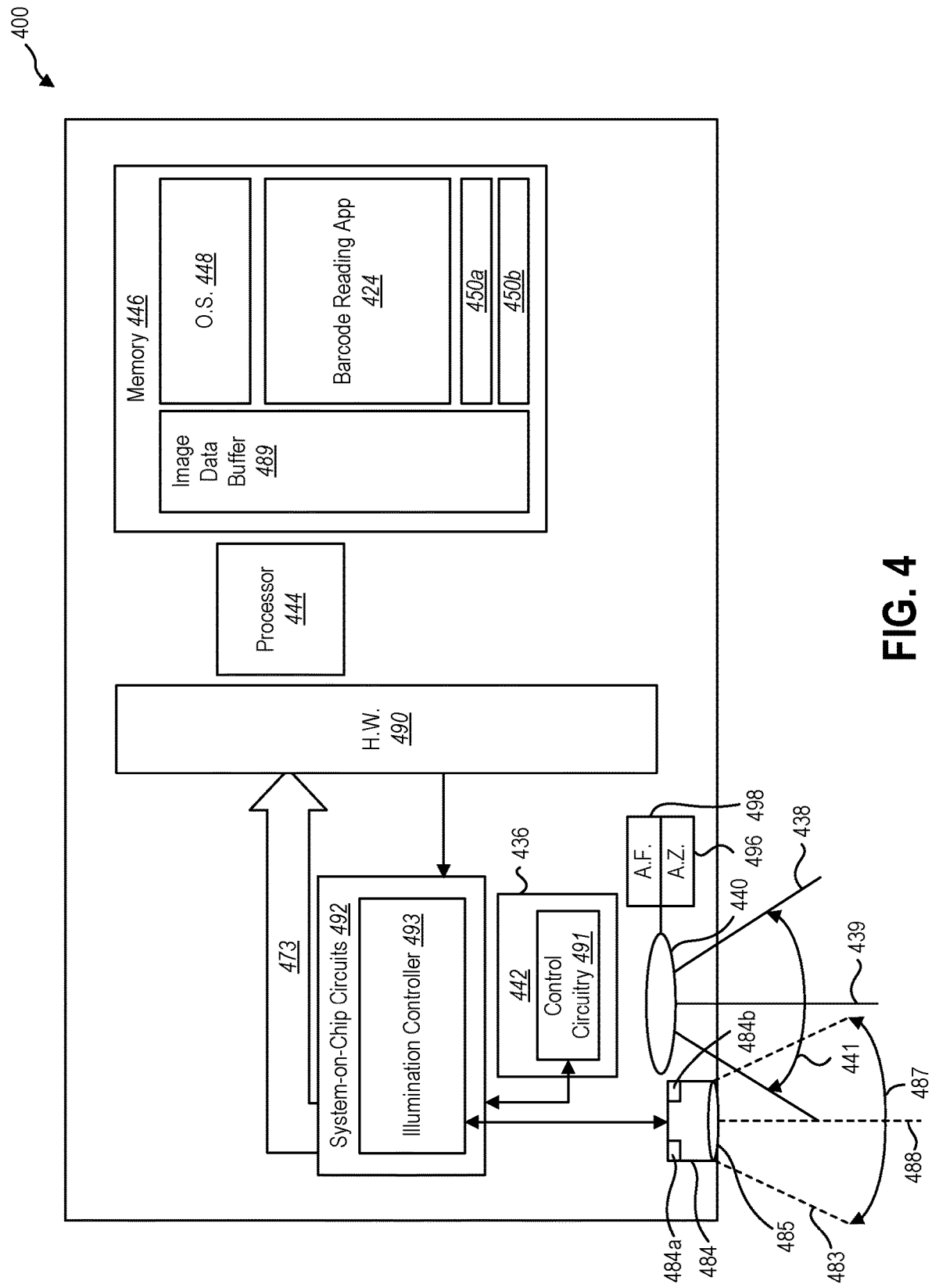
FIG. 4 illustrates an example of a mobile device that may be configured to implement the techniques disclosed herein.

As illustrated in FIG. 4, the memory 446 may include an operating system 448, a barcode reading application 424, one or more other applications 450a, 450b, and a data buffer including an image data buffer 489. In operation, the processor 444 may execute instructions embodied in the operating system 448, the barcode reading application 424, and each of the other applications 450a, 450b. Hardware circuits 490 interface the processor 444 with peripheral systems. The peripheral systems may include, for example, a camera assembly 436 and an illumination source 484 (which may include a white light source, LEDs, and/or other type of illuminators).

The camera assembly 436 may include a combination of hardware for illuminating a target area as well as capturing an image within a field of view of a photosensor array 442. As will be described in further detail below, the mobile device 400 may include independent controllers for respectively controlling exposure of photosensors within the photosensor array 442 and illuminating a target area. As shown in FIG. 4, the camera assembly 436 includes a (color) photosensor array 442, which may be positioned parallel to each of the face surface and the back surface of the mobile device 400. The mobile device 400 may also include a lens assembly 440 with an optical axis 439 orthogonal to the photosensor array 442 and defining a center line of a camera field of view 438 extending outward from the back surface of the mobile device 400. The photosensor array 442 may include one or more photosensors such as complementary metal-oxide-semiconductor (CMOS) photosensors, or the like.

The lens assembly 440 may receive light reflected from objects within the camera field of view 438. The camera field of view 438 may have an angular size 441 which may be the angle at which the camera field of view 438 spreads with respect to distance from the lens assembly 440. The lens assembly 440 may have a camera aperture size measured as f-number which is the ratio of the focal length of the lens assembly 440 to the diameter of the entrance pupil (i.e., the lens aperture (an aperture stop or an inherent aperture of the lens component defining the aperture) as viewed through the front of the lens assembly 440).

The camera assembly 436 may further include an auto zoom module 496 and/or an autofocus module 498 which may serve to control an optical zoom setting and/or autofocus setting of the camera, respectively. Autofocus and auto zoom may be controlled by moving the position of at least one of the lenses making up the lens assembly 440 with respect to each other (or with respect to the photosensor array 442) and/or altering the curvature of at least one of the lenses making up the lens assembly 440.

The photosensor array 442 may include control circuitry 491. The control circuitry 491 may function similarly in some respects to the control circuitry 139 described above in connection with FIG. 1 (e.g., with respect to exposure and coupling of pixels to A/D converters for image read out).

As further shown in FIG. 4, system-on-chip circuits 492 may further include an illumination controller 493 for controlling illumination of a target area by, for example, controlling the illumination source 484. The illumination source 484 may include one or more light-emitting diodes (LEDs) 484a, 484b controlled by the illumination controller 493.

The control circuitry 491 within the photosensor array 442 and the illumination controller 493 are separate components that provide independent control of respective hardware on the mobile device 400. For example, the control circuitry 491 may identify exposure periods for the photosensor array 442 for capturing and processing digital images. Independent of the control circuitry 491, the illumination controller 493 may control illumination of a target area by generating an illumination signal for activating the illumination source 484.

Even if the control circuitry 491 includes circuitry capable of controlling one or more illuminators (e.g., a flash connector, or other output that can be used to control illumination), the illumination source 484 is not controlled by such circuitry in accordance with the present disclosure. Instead, the illumination controller 493 controls illumination of the target area independent of any signals provided by the control circuitry 491.

One or more of the components of the mobile device 400 may be configured to generate a trigger signal that includes a sequence of trigger pulse signals, like the trigger signals 202, 302 shown in FIGS. 2 and 3. In some embodiments, a decoder within the barcode reading application 424 may generate the trigger signal.

The decoder may also provide certain other information to the SOC circuits 492. For example, the decoder may provide the SOC circuits 492 with information that defines the end of an exposure period. The end of an exposure period may be defined with respect to a trigger pulse signal (e.g., an exposure period ends a certain period of time after the trigger pulse signal is detected). The decoder may also provide the SOC circuits 492 with a gain setting, an illumination intensity setting, and an illumination duration setting. The SOC circuits provide the exposure information and the gain setting to the control circuitry 491. The SOC circuits provide the illumination intensity setting and the illumination duration setting to the illumination controller 493.

The illumination controller 493 may be configured to generate an illumination signal, which may be similar to the illumination signals 204, 304 shown in FIGS. 2 and 3. The illumination controller 493 may be configured so that, in response to detecting a trigger pulse signal, the illumination controller 493 changes the value of the illumination signal in the manner shown in FIG. 2 and/or FIG. 3. In addition, the control circuitry 491 may be configured to read out image data from the photosensor array 442 in the manner shown in FIG. 2 and/or FIG. 3.

Moreover, the mobile device 400 may be configured so that it does not use all of the images that are captured by the photosensor array 442. In this regard, the mobile device 400 may be configured to operate similarly to the barcode reader 100 discussed above. Images that have been degraded (e.g., because the illumination source 484 remains on after readout occurs, as discussed above) may be decimated. In some embodiments, images corresponding to odd trigger pulse signals (with the possible exception of the first trigger pulse signal) may be kept and used for decoding and images corresponding to even trigger pulse signals may be decimated. Alternatively, images corresponding to even trigger pulse signals may be kept and used for decoding and images corresponding to odd trigger pulse signals may be decimated.

Figure 5:
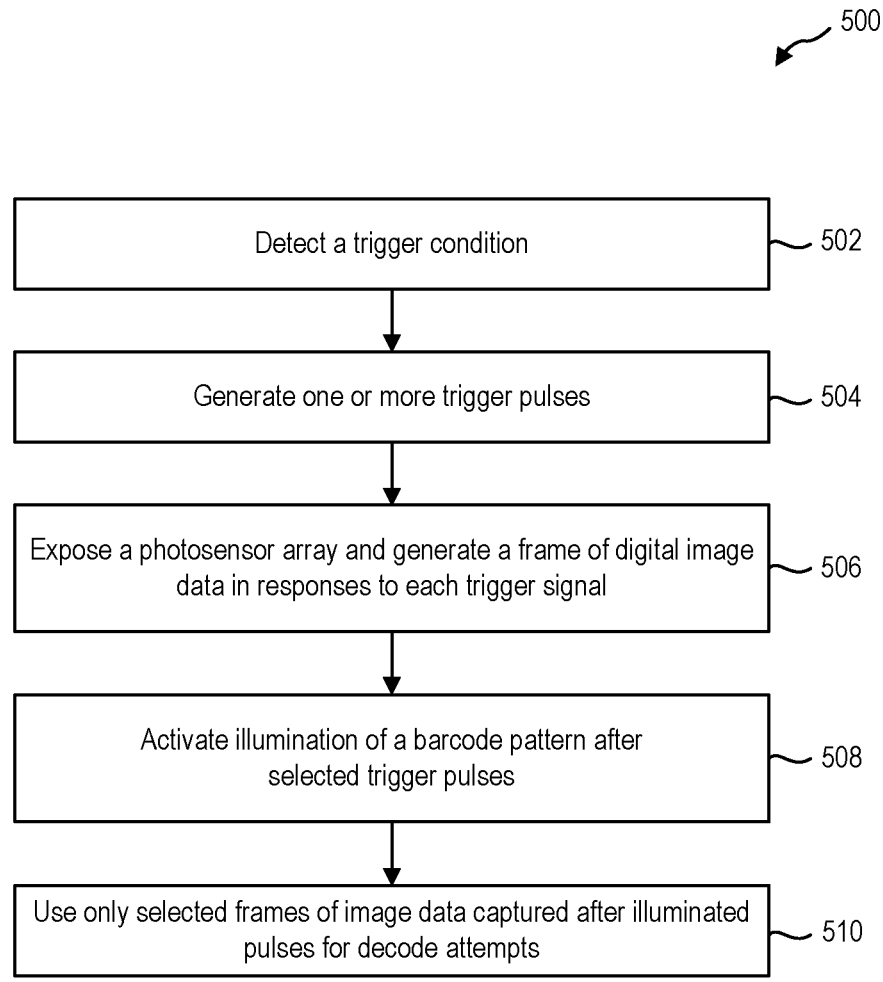
FIG. 5 illustrates a method that may be performed by a barcode reading device in accordance with the present disclosure.

FIG. 5 illustrates a method 500 that may be performed by a barcode reading device in accordance with the present disclosure. Some examples of barcode reading devices include a dedicated barcode reader (such as the barcode reader 100 shown in FIG. 1) and a mobile device that includes barcode reading functionality (such as the mobile device 400 shown in FIG. 4).

The method 500 includes detecting 502 a trigger condition. The trigger condition may be associated with reading a barcode. For example, detecting the trigger condition may involve detecting user input (such as user selection of an option to read a barcode), detecting the presence of a barcode within a relevant field of view (e.g., the field of view of a barcode reader, the field of view of a camera of a mobile device), and/or detecting motion of the barcode reading device.

Detecting 502 the trigger condition may initiate the process of reading barcodes. Thus, in response to detecting 502 the trigger condition, one or more trigger pulse signals may be generated 504. The trigger pulse signals may be, for example, similar to the trigger pulse signals 202a-f, 302a-f that are shown in FIGS. 2 and 3.

The method 500 may also include exposing 506 a photosensor array and generating a frame of image data in response to each trigger pulse. For example, readout of image data from the photosensor array may occur in response to detecting a trigger pulse signal.

The method 500 may also include activating 508 illumination after selected trigger pulse signals. This may include turning on illumination after every odd trigger pulse signal (as shown in FIG. 2) or after every even trigger pulse signal (as shown in FIG. 3).

The method 500 may also include using 510 only selected frames of image data for decode attempts. Other frames of image data may be decimated. For example, frames of image data that have been degraded (e.g., because one or more illumination sources remained on after readout started for a previous frame of image data, as discussed above) may be decimated.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A barcode reading device, comprising:
an image sensor comprising a photosensor array and control circuitry configured to control an exposure period for the photosensor array;
one or more illumination sources configured to generate illumination for illuminating a target area; and
circuitry configured to:
read out image data from the photosensor array in response to a trigger signal, wherein the trigger signal comprises a plurality of trigger pulse signals that occur at fixed intervals, and wherein an interval between successive trigger pulse signals is greater than an amount of time that is required to read out a frame of the image data from the photosensor array; and
independent of controlling the exposure period for the photosensor array, illuminate the target area by switching an illumination signal between an on value that activates the one or more illumination sources and an off value that deactivates the one or more illumination sources with each successive trigger pulse signal.

2. The barcode reading device of claim 1, wherein:
the barcode reading device further comprises memory; and
the circuitry is also configured to, in response to each trigger pulse signal, read out a frame of image data from the photosensor array and store the frame of image data to the memory of the barcode reading device.

3. The barcode reading device of claim 1, wherein:
the on value corresponds to odd trigger pulse signals from the plurality of trigger pulse signals.

4. The barcode reading device of claim 1, wherein:
the on value corresponds to even trigger pulse signals from the plurality of trigger pulse signals.

5. The barcode reading device of claim 1, wherein the image sensor is configured to capture images using a global shutter mode of operation.

6. The barcode reading device of claim 1, further comprising a decoder that is configured to generate the trigger signal in response to detecting a trigger condition, wherein a duration of the exposure period is set by the decoder.

7. The barcode reading device of claim 1, wherein the circuitry causes the illumination signal to switch between the on value and the off value independent of a beginning and an end of the exposure period implemented by the control circuitry.

8. A barcode reading device, comprising:
an image sensor comprising a photosensor array and control circuitry configured to control an exposure period for the photosensor array;
one or more illumination sources configured to generate illumination for illuminating a target area;
a decoder that is configured to generate a trigger signal in response to detecting a trigger condition, wherein the trigger signal comprises a plurality of trigger pulse signals generated at a pulse frequency, and wherein the plurality of trigger pulse signals comprise a first plurality of trigger pulse signals interspersed with a second plurality of trigger pulse signals;
readout circuitry that is configured to read out image data from the photosensor array in response to the trigger signal; and
illumination circuitry configured to generate an illumination signal and to activate, independent of any signaling from the image sensor, the one or more illumination sources for illuminating the target area in response to the trigger signal, wherein the illumination signal causes the one or more illumination sources to be activated following the first plurality of trigger pulse signals and to be deactivated following the second plurality of trigger pulse signals.

9. The barcode reading device of claim 8, wherein:
the barcode reading device further comprises memory; and
the readout circuitry is also configured to, in response to each trigger pulse signal, read out a frame of image data from the photosensor array and store the frame of image data to the memory of the barcode reading device.

10. The barcode reading device of claim 8, wherein:
the illumination signal alternates between an on value corresponding to activating the one or more illumination sources and an off value corresponding to deactivating the one or more illumination sources; and
the on value corresponds to odd trigger pulse signals from the plurality of trigger pulse signals.

11. The barcode reading device of claim 8, wherein:
the illumination signal alternates between an on value corresponding to activating the one or more illumination sources and an off value corresponding to deactivating the one or more illumination sources; and
the on value corresponds to even trigger pulse signals from the plurality of trigger pulse signals.

12. The barcode reading device of claim 8, wherein the image sensor is configured to capture images using a global shutter mode of operation.

13. The barcode reading device of claim 8, wherein a duration of the exposure period is set by the decoder.

14. A barcode reading device, comprising:
an image sensor comprising a photosensor array and control circuitry configured to control an exposure period for the photosensor array;
one or more illumination sources configured to generate illumination for illuminating a target area;
a decoder that is configured to generate a trigger signal in response to detecting a trigger condition, wherein the trigger signal comprises a plurality of trigger pulse signals;
memory comprising an image buffer;
readout circuitry that is configured to, in response to each trigger pulse signal, read out a frame of image data from the photosensor array and store the frame of image data to the image buffer; and
illumination circuitry configured to activate, independent of any signaling from the image sensor, the one or more illumination sources for illuminating the target area in accordance with an illumination signal, wherein the plurality of trigger pulse signals cause the illumination signal to alternate between an on value corresponding to activating the one or more illumination sources and an off value corresponding to deactivating the one or more illumination sources.

15. The barcode reading device of claim 14, wherein the on value corresponds to even trigger pulse signals from the plurality of trigger pulse signals.

16. The barcode reading device of claim 14, wherein the on value corresponds to odd trigger pulse signals from the plurality of trigger pulse signals.

* * * * *